UNITED STATES PATENT OFFICE.

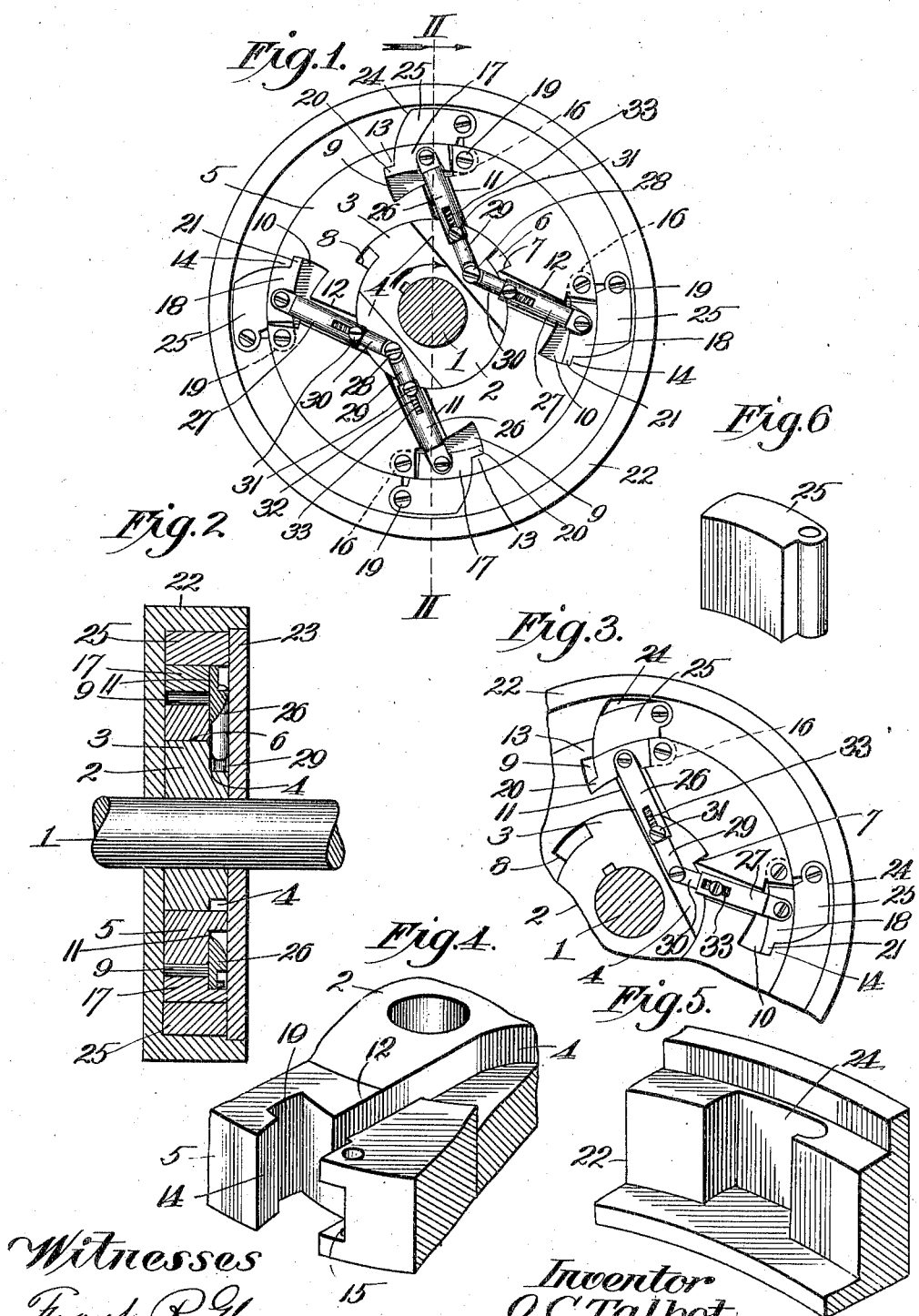

OLIVER C. TALBOT, OF KANSAS CITY, MISSOURI.

AUTOMATIC CLUTCH.

965,606.  Specification of Letters Patent.  Patented July 26, 1910.

Application filed October 25, 1909. Serial No. 524,297. REISSUED

*To all whom it may concern:*

Be it known that I, OLIVER C. TALBOT, a citizen of the United States, residing at Kansas City, in the county of Jackson and State of Missouri, have invented certain new and useful Improvements in Automatic Clutches, of which the following is a specification.

This invention relates to automatic clutches for wheeled vehicles, such as motor cars, and contemplates the provision of a simple and reliable clutch for positively locking the wheels to the drive shaft in forward or retrograde movement and adapted, in making a turn, to permit the outer wheel to overrun.

To this end the invention consists in certain novel and peculiar features of construction and organization as hereinafter described and claimed; and in order that it may be fully understood reference is to be had to the accompanying drawing, in which—

Figure 1, is a vertical section of a drive shaft equipped with a clutch embodying my invention, the inner face plate of the clutch being omitted. Fig. 2, is a section on the line II—II of Fig. 1. Fig. 3, is a view corresponding to Fig. 1, but showing only a fragment of the clutch. Fig. 4, is an enlarged sectional perspective view of the inner section of the clutch. Fig. 5, is a sectional perspective view of the outer section of the clutch. Fig. 6, is a detail perspective view of one of the dogs for locking the sections of the clutch together.

In the said drawing, where like reference characters indicate corresponding parts in all the figures, 1 indicates the drive-shaft of a motor car or other wheeled vehicle, equipped near each end with a collar 2 having a peripheral projection 3, and provided at its inner side with diametrically opposite recesses 4.

Journaled on each collar 2, is a collar 5, provided with a recess 6, receiving the projection 3 and of slightly greater length than the same, the opposite ends of said recess constituting oppositely disposed shoulders 7 and 8 against which the adjacent ends of the projection 3 are adapted to abut accordingly as the vehicle is propelled forward or rearward respectively.

The collar 5 is provided with two sets of diametrically opposite peripheral openings 9 and 10 respectively, and in its inner face with passages 11 and 12 connecting the openings 9 and 10 respectively with recesses 4. The openings 9 and 10 are of slightly reduced length at their outer sides to provide inwardly-disposed shoulders or stops 13 and 14 respectively. At the opposite ends of said openings the collar is recessed at 15, to receive the ears 16 of the dogs 17 and 18 occupying openings 9 and 10 respectively, screw-bolts 19 secured to collar 5 and extending through the ears 16, providing pivotal supports for the dogs 17 and 18, outward movement of the dogs 17 being limited by the engagement of their extensions 20 with shoulders or stops 13 and outward movement of the dogs 18 being limited by the engagement of their extensions 21 with shoulders or stops 14, it being noted that when the dogs are all disposed at their outermost limit of movements, their outer faces lie in the same circle as and form a continuation of the periphery of the said collar.

Hereinafter where general reference is made to the inner section of the clutch it is to be understood that collars 2 and 5 are referred to.

Of the outer section of the clutch only the hub is shown, as the spokes, rim and tire may be of any suitable or preferred type. The hub is preferably in the form of a circular casing 22 fitting snugly and rotatably on the inner section, the inner face-plate or cap 23 being removable. The rim of the hub is provided in its inner side with cavities 24 wherein are pivoted dogs 25, either of the dogs 17 being capable of swinging downward into either of the openings 9 and either of the dogs 18 being capable of swinging into either of the openings 10.

Extending loosely and capable of longitudinal and slight lateral movement within passages 11 and passages 12 respectively, are tubular rods 26 and 27, the outer ends of said rods being respectively pivoted to dogs 17 and 18.

Pivoted at 28 within recesses 4 and to the collar 2 at diametrically opposite points, are rods 29 and 30 fitting telescopically in tubular rods 26 and 27 respectively, and secured to rods 29 and 30 are stop pins 31 projecting through longitudinal slots 32 in the tubular rods, said pins by engagement with the opposite ends of said slots limiting the extension and contraction of the telescopic connections between collar 2 and the dogs pivoted to collar 5, and in order to provide means for always holding either the dogs 17 or the dogs 18 at their outer limit of movement accordingly as the car is running backward or forward, the tubular rods contain springs 33 which resist retractive movement of the telescopic connections.

Assuming that the parts initially occupy the relation shown in Fig. 1, it will be seen that as the drive-shaft is started in the direction indicated by the adjacent arrow, Fig. 1, it will cause collar 2, to turn in the same direction and swing dogs 17 inward by the time the lug 3 strikes shoulder 7 of collar 5, the rods 30 being at the same time forced outward in the tubular rods 27 against the resistance of the springs 33 in said tubular rods, this outward pressure of the springs serving to maintain the dogs 18 in their extreme outward positions and thus guard against any of the dogs 25 swinging into openings 10. As the dogs 17 are thus swung inward as explained, the uppermost dog 25 swings downward into the registering opening 9 and at the same instant collar 5 starts to rotate under the pressure of the lug 3 of collar 2. This movement of collar 5 through pressure on the said dog 25 imparts rotation to the outer section or wheel, and it will be understood that as the said dog 25 is carried below the plane of the drive shaft and the companion dog 25 above the plane of the drive shaft, the former swings downward and out of the said opening 9 while the companion dog 25 swings downward and into its registering opening 9 so that the outer wheel on the drive shaft shall be positively driven as long as the car travels in a direct line, and in making a turn is free to overrun as will be readily understood, and after the turn is made the parts resume their original relation.

As the forward movement of the car is arrested, the dogs 17 and 18 are moved outward under the pressure of their respective springs 33 and if the arrest occurs when the dogs are in the relative positions shown in Fig. 3, the outward movement of said dogs imparts corresponding movement to the juxtaposed locking dogs 25. If the arrest occurs when said dogs are out of alinement, the dogs 17 are moved out as explained, the dogs 25 being held out by reason of their peripheral engagement with collar 5.

It will be noted that in the operation of the clutch there is practically no strain imposed on the telescopic connections, as the dogs 17 and 18 are utilized solely for the purpose of permitting dogs 25 to interlock with collar 5 or to force said dogs 25 out of the openings 9 or 10 as the case may be.

When the parts are interlocked together the power is transmitted from the collar 5 of the inner section to the hub of the outer section through the instrumentality solely of one or more of the dogs 25, which are of such proportion as to be capable of withstanding any pressure which may be imposed upon them, it being understood that they are loosely pivoted to the hub so that no strain shall be imposed upon their pivots.

When the direction of movement is reversed, that is when the machine is backed under the power of the drive-shaft, the lug of the inner collar engages shoulder 8 of collar 5, the dogs 18 being drawn inward and the dogs 17 pushed outward. As a result the dogs 25 enter the openings 10. It will thus be seen that the operation of the parts is the same as above described with reference to the forward movement of the machine except that the dogs of the outer section or wheel operate in conjunction with the openings 10 for the purpose of driving the machine backward.

From the above description, it will be apparent that I have produced a positive clutch which will perform its function efficiently and reliably, which embodies the desirable features of simplicity, strength, durability, compactness and cheapness of construction and that it is susceptible of change in minor particulars without departing from the spirit and scope of the appended claims.

Having thus described the invention what I claim as new and desire to secure by Letters Patent, is:—

1. The combination of a drive-shaft, a collar secured thereon and provided with a peripheral lug, a collar surrounding the first-named collar and provided with a recess receiving and of slightly greater length than said lug and also provided with peripheral opening dogs pivoted to the outer collar and capable of swinging inward and outward in said openings, extensible connections pivotally connecting said dogs with the inner collar, an outer section journaled on the collar provided with said openings, and provided in its inner side with cavities, and dogs pivoted in said cavities and adapted to swing inward into said peripheral openings after the dogs thereof are moved inward and adapted at times to be forced outward out of said openings when the dogs of the latter are moved outward.

2. The combination of a drive shaft, a collar secured thereon and provided with a peripheral lug, a collar surrounding the first-named collar and provided with a recess receiving and of slightly greater length than said lug and also provided with peripheral openings, dogs pivoted to the outer collar and capable of swinging inward and outward in said openings, extensible connections pivotally connecting said dogs with the inner collar, yielding means tending to hold said connections extended and the said dogs with their outer sides in the same circle as and forming a continuation of the periphery of said outer collar, an outer section journaled on the collar provided with said openings, and provided in its inner side with cavities, and dogs pivoted in said cavities and adapted to swing inward into said peripheral openings after the dogs thereof are moved inward and adapted at times to be forced outward out of said openings when the dogs of the latter are moved outward.

3. The combination of a drive shaft, a collar secured thereon and provided with a peripheral lug, a collar surrounding the first-named collar and provided with a recess receiving and of slightly greater length than said lug and also provided with peripheral openings, dogs pivoted to the outer collar and capable of swinging inward and outward in said openings, extensible connections pivotally connecting said dogs with the inner collar, yielding means tending to hold said connections extended and the said dogs with their outer sides in the same circle as and forming a continuation of the periphery of said outer collar, means for preventing said dogs swinging outward beyond said last-named position, an outer section journaled on the collar provided with said openings, and provided in its inner side with cavities, and dogs pivoted in said cavities and adapted to swing inward into said peripheral openings after the dogs thereof are moved inward and adapted at times to be forced outward out of said openings when the dogs of the latter are moved outward.

4. The combination of a drive shaft, a collar secured thereon and provided with a peripheral lug, a circular collar journaled on the first-named collar and provided with a recess receiving and of slightly greater length than said lug and adapted by the engagement of one end or the other of said lug to be rotated in a forward or backward direction, and provided also with two sets of peripheral openings, one set facing in the opposite direction to the other set, correspondingly facing dogs occupying one set of said openings and oppositely facing dogs occupying the other set of said openings, the dogs being pivoted to the said outer collar and adapted to swing toward and from the shaft, extensible connections pivotally connecting each of said dogs with the first-named collar, springs tending to hold said connections extended and their connected dogs with their outer sides in the same circle as and forming a continuation of the periphery of said outer collar, and an outer section journaled on the collar provided with the openings, and provided in its inner side with cavities, and dogs pivoted in said cavities and adapted to swing inward into said peripheral openings after the dogs thereof are moved inward and adapted at times to be forced outward out of said openings when the dogs of the latter are moved outward.

In testimony whereof I affix my signature, in the presence of two witnesses.

OLIVER C. TALBOT.

Witnesses:
  HELEN C. RODGERS,
  G. Y. THORPE.